United States Patent [19]

Fevre et al.

[11] Patent Number: 5,673,937
[45] Date of Patent: Oct. 7, 1997

[54] ENERGY-ABSORBING DEVICE FOR AUTOMOBILE VEHICLE STEERING COLUMNS

[75] Inventors: Laurent Fevre, Saint Sulpice; Eddy DuPont; Jean-Michel Fouquet, both of Vendome, all of France

[73] Assignee: Nacam, Vendome, France

[21] Appl. No.: 340,145

[22] Filed: Nov. 15, 1994

[30] Foreign Application Priority Data

Nov. 29, 1993 [FR] France ................................. 93 14260

[51] Int. Cl.⁶ .................................................. B62D 1/18
[52] U.S. Cl. ........................... 280/777; 74/493; 280/775
[58] Field of Search ................................. 280/775, 777, 280/779; 74/493; 188/371, 376, 377

[56] References Cited

FOREIGN PATENT DOCUMENTS

| 2599697 | 1/1990 | France . |
|---------|--------|----------|
| A2814145 | 10/1978 | Germany . |
| C3619125 | 10/1987 | Germany . |
| A1523638 | 6/1978 | United Kingdom . |
| 2244032 | 11/1991 | United Kingdom . |
| A2264906 | 9/1993 | United Kingdom . |

*Primary Examiner*—Eric D. Culbreth
*Attorney, Agent, or Firm*—Emmanuel J. Lobato; Burns & Lobato, P.C.

[57] ABSTRACT

An energy-absorbing device for an automobile steering column having a body-tube housing the steering shaft. A support made as two parallel vertical members mountably fixed on a vehicle body mount the steering column axially between them. The body-tube has reinforcement members on two opposite sides. An attaching device compresses the reinforcement members in the support with a tightening non-rotatable bolt extending axially through the body-tube reinforcement members and the support members. A nut on one end of the bolt is tightened by an operator for establishing a determined level of a frictional force between the support and body tube. The reinforcement members have release passage openings for the tightening member in the form of an edge notch open in the direction of the driver's wheel to allow the body-tube to translate axially free in response to an impact force parallel to the body-tube longitudinal axis in a direction away from the driver's wheel at a force level greater than the determined frictional force between the body-tube and support, as when an unrestrained driver impacts the steering wheel in a collison. A deformable element to which the body-tube tube is articulated absorbs the impact force energy as the body-tube translates in response to the impact force. An elongated passage opening in the support for the tightening element provides for adjusting inclination of steering columns if needed.

18 Claims, 10 Drawing Sheets

1

ENERGY-ABSORBING DEVICE FOR AUTOMOBILE VEHICLE STEERING COLUMNS

BACKGROUND OF THE INVENTION

1. Field of the Invention

This invention relates to an automobile vehicle steering column energy-absorbing device, whose steering shaft is mounted in a body-tube, and which is supported and locked to the vehicle body in the desired position.

2. Description of the Prior Art

Improving the passive safety of automobiles has led automobile makers to equip steering columns with energy-absorbing devices. In the event of a front-end collision, these systems are intended to reduce the force experienced by an unrestrained driver against the steering wheel by progressively dissipating the energy absorbed in the column. Many energy-absorbing devices are available for this that can be adapted to the different types of automobile vehicle steering, particularly those based on plastic deformation of a metal element which is generally made from sheet steel. These devices, however, do not allow the different factors relating to the force at which they are set in motion and the energy absorbed to be accurately determined or adjusted.

SUMMARY OF THE INVENTION

The object of the invention is to propose an energy-absorbing device that is easily adaptable to automobile vehicle steering columns and which allows both the force at which the device is set in motion and the energy absorbed to be accurately determined.

According to the invention, the energy-absorbing device relates to an automobile vehicle steering column, the steering shaft of which is mounted in a body-tube, and which is supported and locked in the desired position on the vehicle body, said device comprising:

a support connected to the vehicle body and receiving the body-tube, a system for locking the body-tube in the support, the locking axis of which is perpendicular to the steering column axis, the body-tube having passages traversed by the locking system, at least one articulation of the body-tube on the support, said articulation being rigidly locked with the body-tube, at least one deformable element rigidly locked with the support, and connected to the articulation of the body-tube on the support, in such a way that in the event of an impact, the body-tube drives the deformable element so as to absorb energy, each passage in the body-tube having a release directed in the direction of the driver steering wheel, so as to allow said body tube to free itself from the locking system.

According to one embodiment of the invention, the deformable element is a separate part added to the support. In another embodiment of the invention, the deformable element is an integral part of the support.

In one embodiment, the body-tube is locked in the support by means of a reinforcement part which is rigidly locked with the body-tube. This reinforcement part comprises vertical members each with a passage traversed by the locking system. The support comprises corresponding vertical members each having an elongated hole.

The locking system can comprise:

a tightening bolt traversing the elongated hole in each vertical member of the support as well as the passage in each vertical member of the reinforcement part, said tightening bolt being immobilized in rotation, a nut mounted on one of the threaded ends of the tightening bolt on the outside of the corresponding vertical member of the support, an operating device mounted on the other threaded end of the tightening bolt on the outside of the corresponding support, a distance sleeve mounted on the tightening bolt between the two vertical members of the reinforcement part, in such a way that the desired locking is obtained by rotating the operating device in the desired direction about the locking axis.

In such an embodiment, the support is advantageously made up of:

two vertical members connected to each other in their lower portion by a connecting element, the reinforcement part being produced in the form of a single part or as several parts, each of the two vertical members is prolonged in its upper portion by a lateral bearing face, substantially perpendicular to the corresponding vertical member, each lateral bearing face coming to bear against the vehicle body and whose contour is conjugate with that of the part of the corresponding vehicle body so as to be able to be fixed there, the two vertical members can have an elongated hole for the passage of the locking axis, which allows the steering column to be moved for its inclination adjustment, the two vertical members have a passage hole for the articulation of the reinforcement part belonging to the body-tube.

The reinforcement part is preferably made up of two vertical members connected to each other in their lower portion by a connecting element, the reinforcement part being produced in the form of a single part or as several parts, the two vertical members are rigidly locked in their upper part with the body-tube, the passage with its release provided on each vertical member, and which is to be traversed by the locking axis, is produced by a notch, each notch comprises a semi-circular bottom, whose axis corresponds to the locking axis, and which is prolonged by two sides that are parallel with respect to each other and which lead to the end of the vertical member on the driver steering wheel side, each of the two vertical members has a passage hole for the articulation of the reinforcement part on the support, said passage holes being at the end of the vertical members, farthest from the driver.

Advantageously, the articulation of the reinforcement part of the body-tube on the support is made up of two semi-axes or pivots which are mounted on each vertical member of the body-tube and of the support.

In the embodiment in which the deformable element is a separate part connected to the articulation made up of the semi-axis, the semi-axis connects the deformable element, the corresponding vertical member of the support, and the corresponding vertical member of the reinforcement part, each of which has a passage hole for the semi-axis, whose head bears against the inner face of the vertical member of the reinforcement part, and whose end bears against the outer face of the deformable element.

If the deformable element is integrated with the support, which is connected to the articulation made up of the semi-axis, the semi-axis connects the deformable element integrated with the vertical member of the support, and the corresponding vertical member of the reinforcement part, each of which has a passage hole for the semi-axis, whose head bears against the inner face of the vertical member of the reinforcement part, and whose end beam against the outer face of the corresponding vertical member of the support.

According to one embodiment of the invention, the deformable element is made up of a tie rod connected to the support in the region of the elongated passage hole in the corresponding vertical member, and which is drilled at the other end to receive the pivot pin of the corresponding semi-axis, each vertical member of the support for a notch on the passage hole of the semi-axis, the width of said notch being less than the diameter of the semi-axis, pivot pin such that in the event of an impact, each pivot semi-axis connected to the reinforcement part can free itself from the support by passing through the corresponding notch, and that the semi-axis pivot pin body-tube drives the tie rod so as to absorb the desired energy. In this type of embodiment, the tie rod can be connected to the support by welding, crimping, riveting or bolting/screwing. According to another embodiment, a tie rod can be provided on each vertical member of this support.

In one embodiment of the invention in which the deformation element is made up of a tie rod, said tie rod can be placed above the steering shaft and connected to each semi-axis so as to form a symmetrical system. According to another embodiment in which a separate deformation element is used, said separate deformation element can be made up of a tie rod placed below the steering shaft, and connected to each semi-axis so as to also form a symmetrical system.

In the embodiment of the invention, in which the deformable element is integrated with the support, this deformable element is made up of a zone of the body-tube or of each of its vertical members, and which is arranged around the passage hole of the articulation. According to different embodiments of the invention, the zone of the deformable element can comprise at least one of the following characteristics:

a crescent-shaped cut-out directed substantially in the direction of the inclination axis, a U-shaped cut-out directed substantially perpendicular to the inclination axis, a cut-out in the shape of two herring bones arranged on either side of the passage hole and directed in the direction of the inclination axis, a cut-out in the form of two elongated holes arranged either side of the passage hole perpendicular to the inclination axis, a cut-out in the form of an elongated hole arranged in the direction of the inclination axis, and leading into the passage hole, a fold-back of the vertical member in the form of a tab comprising the passage hole, and covering a notch arranged in the direction of the inclination axis.

According to the invention, the operating mode of the device for absorbing energy due to an impact on the steering column of an automobile vehicle, the steering shaft of which is mounted in a body-tube, and which is supported and locked to the vehicle body in the desired position, comprises the following phases:

the driver strikes the steering wheel and transmits the force to the body-tube, when this force reaches a sufficient value, at least one deformable element is driven so as to absorb energy, the deformation element being rigidly locked with the support and connected to the body-tube by the articulation of the body-tube on the support, each passage made for the axis of the system for locking the body-tube in the support being provided with a release to allow the release of the locking system.

The driver can also strike the inflated air bag and transmit an force to the steering wheel via this air bag.

The automobile vehicle steering column energy-absorbing device of the invention therefore has the advantage of being easily adaptable to existing automobile vehicle steering columns, and at the same time anticipate and accurately adjust the force at which the device is set in motion as well as the energy absorbed.

BRIEF DESCRIPTION OF THE DRAWINGS

A number of embodiments of the invention will now be described by means of non-limiting examples which must be read in conjunction with the attached drawings. In these drawings.

DESCRIPTION OF THE PREFERRED EMBODIMENTS

Figure 1:
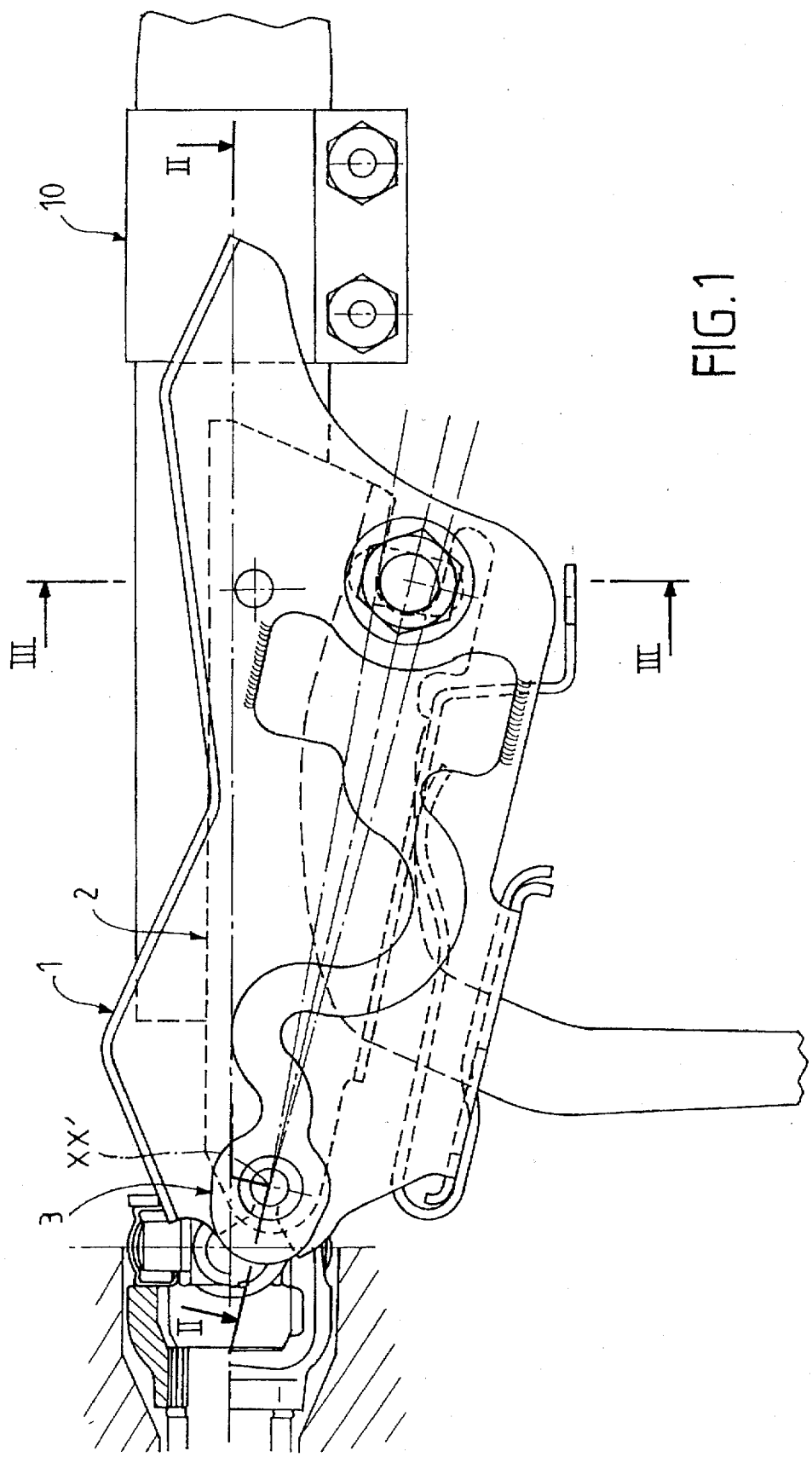
FIG. 1 is an axial longitudinal view of the steering column energy-absorbing device of the invention.
Figure 2:
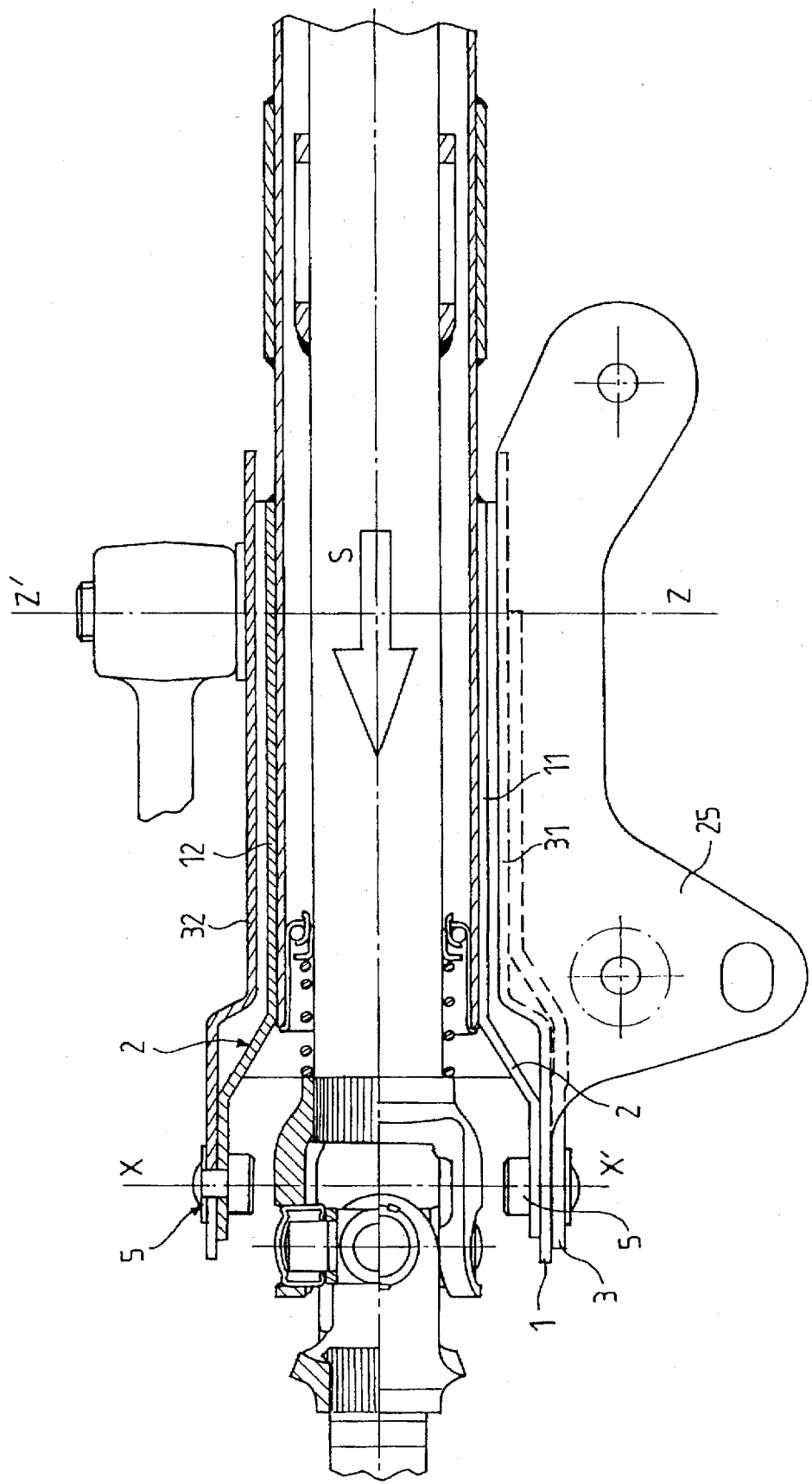
FIG. 2 is a half-view from above, and a half-section along line II—II of FIG. 1.
Figure 3:
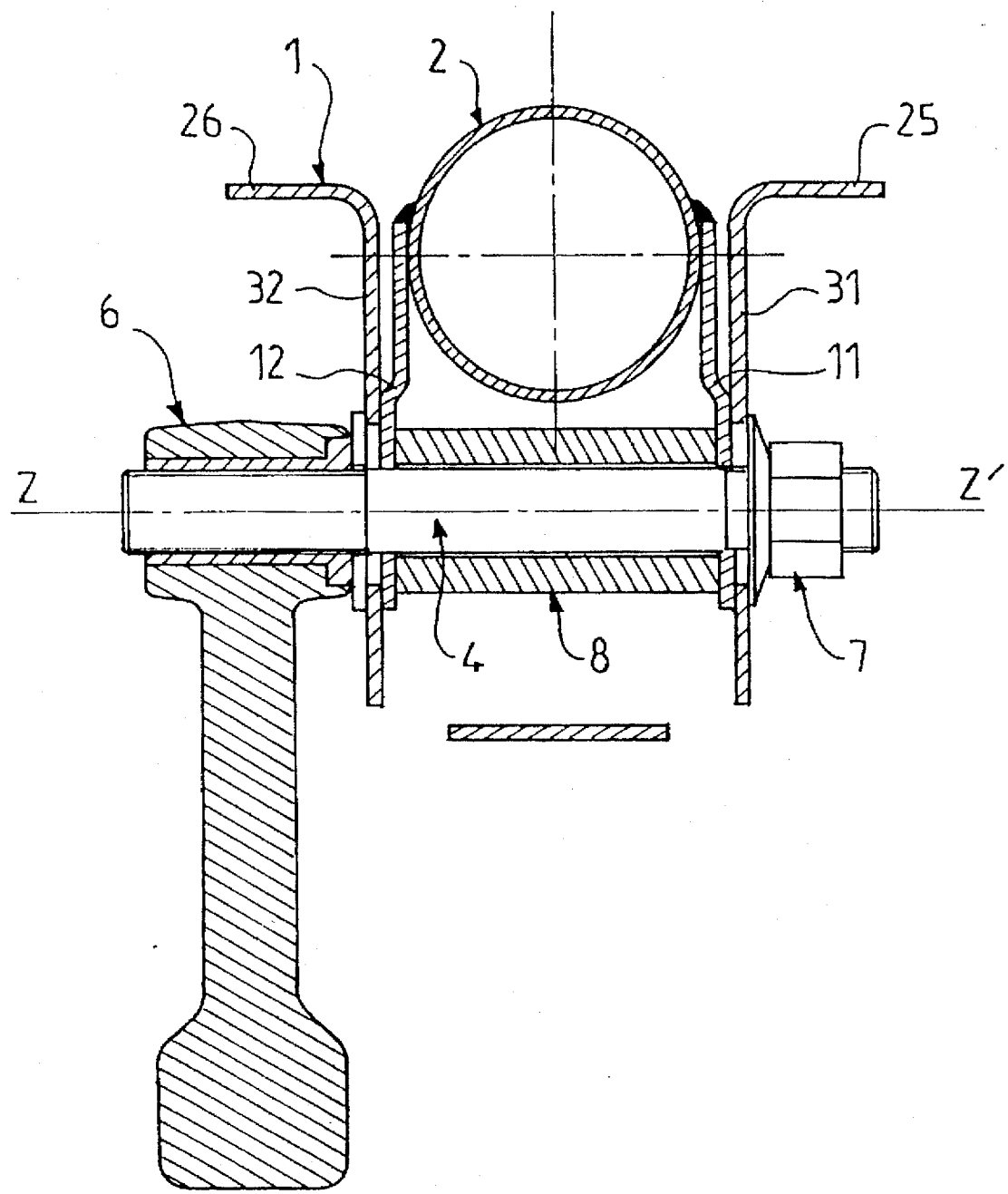
FIG. 3 is a transversal section along line III—III of FIG. 1.

The energy-absorbing device of the invention applies to an automobile vehicle steering column, particularly one which is adjustable in inclination, as shown in FIGS. 1, 2 and 3.

The steering shaft of this column is mounted in a body-tube 10 by means of bearings. Body-tube 10 is supported and locked to the vehicle body in the position desired.

A support 1 is connected to the vehicle body and receives body-tube 10. This support 1 is the fixed part of the column and does not move during adjustment.

A strengthening reinforcement part 2 is rigidly locked with body-tube 10, this assembly being the moving body and the part that supports the steering shaft. This assembly moves about the axis X—X' during adjustment.

This reinforcement part assembly is conventional, but could be replaced by an equivalent assembly designed to mount body-tube 10 on support 1.

A locking system or fastening device is rigidly locked with body-tube 10 by means of its reinforcement part in support 1. The locking axis of this locking system is perpendicular to the axis of the steering column.

The energy-absorbing device of the invention comprises at least one deformable element which is rigidly locked with support 1 and which is connected to the reinforcement part 2 of body-tube 10 by means of a link element. In the case of FIGS. 1 to 3, the deformable element is a tie rod 3 mounted on the support 1.

Support 1 is made up of two vertical members 31 and 32 which are connected to each other in their lower portion by a connecting element 27. The two vertical members and the connecting element can be a single part or formed from several parts. Each vertical member 31 and 32 is provided in its upper portion with a lateral bearing face or flange, respectively 25 and 26. Each bearing face 25 and 26 is substantially perpendicular to the corresponding vertical member 31 and 32. Each lateral bearing face 25 and 26 bears against the vehicle body, and has a contour conjugate with the contour of the part of the corresponding vehicle body so as to be able to be fixed thereto.

The two vertical members 31 and 32 of support 1 each have an elongated passage hole 28 for the passage of the axis of the locking system. This elongated hole is dimensioned so as to allow the steering column to be moved through its range of adjustment in inclination. Furthermore, the two vertical members 31 and 32 have a passage hole 29 for the articulation of reinforcement part 2 belonging to body-tube 10. Note that the elongated holes 28 are not necessary for steering columns whose inclination is not adjustable. The invention also has applications for this type of column.

Reinforcement part 2 is made up of two vertical members 11 and 12, which are connected to each other, in their lower portion, by a connecting element 13. Reinforcement part 2 can be a single part or an assembly of several parts. The two vertical members 11 and 12 are rigidly secured with the body-tube in their upper portion by welding beads as shown in FIG. 1.

Each vertical member 11 and 12 has a passage 14 through which the axis of the locking system is intended to pass. Each passage 14 has a release 15 produced by a notch 16. Each notch 16 is made up of a semi-circular bottom 17 whose axis corresponds to the axis of the locking system, and this semi-circular bottom 17 is prolonged by two sides 18 which are parallel with respect to each other, and which lead to end 20 of the vertical member on the driver steering wheel side.

Finally, the two vertical members 11 and 12 have a passage hole 19 for the articulation of reinforcement part 2 on support 1. Passage hole 19 is at the other end 21 of each vertical member, farthest from the driver.

The system or fastening device for locking body-tube 10 by its reinforcement part in support 1 is made up of a tightening element in the form of bolt 4 which traverses each vertical member 31 and 32 of support 1, and each vertical member 11 and 12 of strengthening square 2. More precisely, tightening bolt 4 passes through elongated hole 28 in each vertical member 31 and 32 of support 1, and passage 14 of each vertical member 11 and 12 of reinforcement part 2. Furthermore, bolt 4 is locked in rotation.

A nut 7 is mounted on one of the threaded ends of tightening bolt 4, on the outside of corresponding vertical member 31 of support 1. An operating device 6 is mounted on the other end of tightening bolt 4, on the outside of corresponding vertical member 32 of support 1. Finally, a distance or spacer sleeve 8 is mounted on tightening bolt 4 circumferentially thereof between the two vertical members 11 and 12 of reinforcement part 2.

Operating device 6 is tapped and mounts on the end of threaded bolt 4, and when rotated causes the axis of bolt 4 to move by means of a bolt-nut system. This axial movement tends to compress or release to a greater or lesser extent reinforcement part 2 with respect to support 1, body-tube 2 being disposed between support 1 and distance sleeve 8. Tightening bolt 4 is immobilized in rotation by a system not shown. Nut 7 is used to adjust the tension in tightening bolt 4 along axis Z—Z'. The reinforcement part is therefore locked with respect to support 1 purely by adherence.

It should be noted that any other system that can lock the body-tube with respect to the support by adherence can be used, for example cam or toggle lever systems, without leaving the framework of the invention.

The articulation of reinforcement part 2 of body-tube 10 on support 1 is made up of two semi-axes 5 which are each mounted on corresponding vertical members 11 and 31 on the one hand, and on 12 and 32 on the other hand. This articulation forms the lower pivot of the steering column.

The link element between reinforcement part 2 and the deformable element made up of tie rod 3 is made up of one of the semi-axes 5.

The link element made up of semi-axis 5 connects the tie rod used as a deformable element, the corresponding vertical member 31 of support 1, and the corresponding vertical member 11 of strengthening square 2. Each of these vertical members 11 and 31 has a passage hole 19 and 29 for semi-axis 5 whose head bears against the inner face of vertical member 11 of reinforcement part 2, and whose end bears against the outer face of the deformable element, i.e. of the tie rod. Semi-axis or pivot 5 can also be mounted in such a way that the head bears against the outer face of the deformable element and the end against inner face of vertical member 11 of reinforcement part 2.

The other semi-axis 5 connects vertical member 32 of support 1, and the corresponding vertical member 12 of reinforcement part 2. Each vertical member 12 and 32 has a passage hole 19 and 29 for semi-axis 5 whose head bears against the inner face of vertical member 12 of reinforcement part 2, and whose end bears against the outer face of corresponding vertical member 32 of support 1. Semi-axis 5 can also be mounted such that the head bears against the outer face of the corresponding vertical member 32 of support 1 and the end against the inner face of vertical member 12 of reinforcement part 2.

Figure 13:
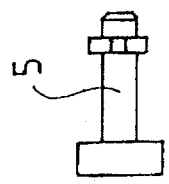
FIG. 13 shows a variant of a semi-axis.
Figure 14:
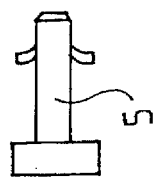
FIG. 14 shows a variant of a semi-axis.
Figure 15:
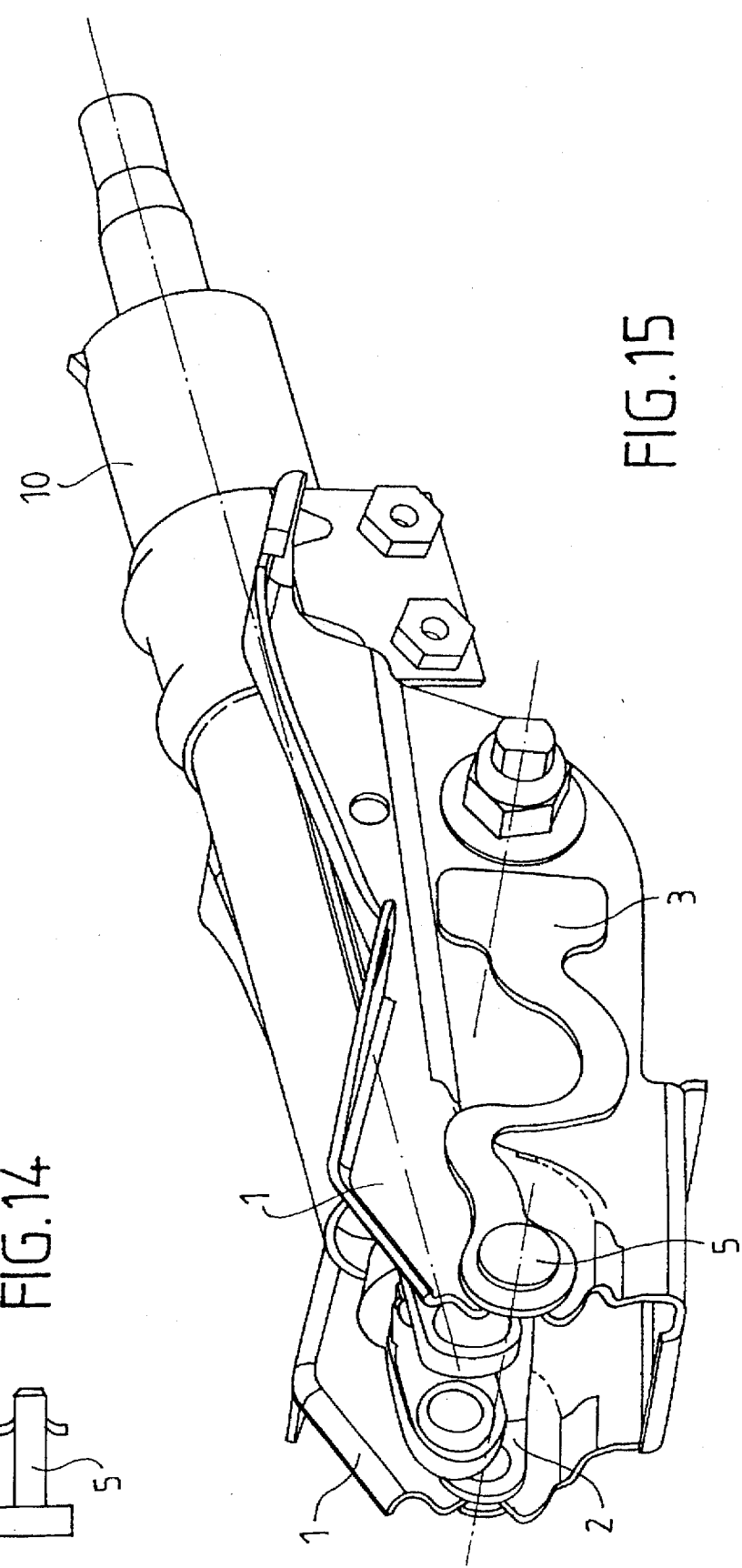
FIG. 15 is a view in perspective corresponding to FIG. 1.

In different embodiments, semi-axes 5 can be rivets, bolts/screws or pins with the head mounted on the inner or outer side of the corresponding vertical member of support 1 or reinforcement part 2, or on the side of the outer face of the deformable element. Semi-axes 5 can be produced with an end made up of a throat having a circlip or a retaining ring as shown in FIG. 13. The axes can also be smooth with a self-tightening retaining ring, which is the case shown in FIG. 14. In another embodiment, the two semi-axes 5 can be replaced by a single axis.

The deformable element made up of tie rod 3 is connected to support 1 in the region of elongated passage hole 28 in corresponding vertical member 31. This tie rod 3 is drilled at the other end to receive the pin of corresponding semi-axis 5.

In this type of embodiment of the invention, each vertical member 31 and 32 of support 1 has a notch 30 on passage hole 29 of semi-axis 5. The width of this notch 30 is smaller than the diameter of semi-axis 5, so that in the event of an impact, each semi-axes 5 connected to strengthening square 2 can free itself from support 1 by passing through corresponding notch 30, thus allowing semi-axis 5 of tie rod 3 to drive the tie rod 3 so as to absorb energy.

Thus, in the event of an impact, body-tube 10 with its reinforcement part 2 drives the deformable element made up of tie rod 3 so as to absorb energy. Passage 14 of reinforcement part 2 has a release 15 oriented in the direction of the driver steering wheel, which allows reinforcement part 2 to free itself from the locking system.

In the case of FIGS. 1 to 3, tie rod 3 is connected to support 1 by welding. Without leaving the framework of the invention, this tie rod 3 could be connected to support 1 by crimping, riveting or bolting/screwing.

Figure 16:
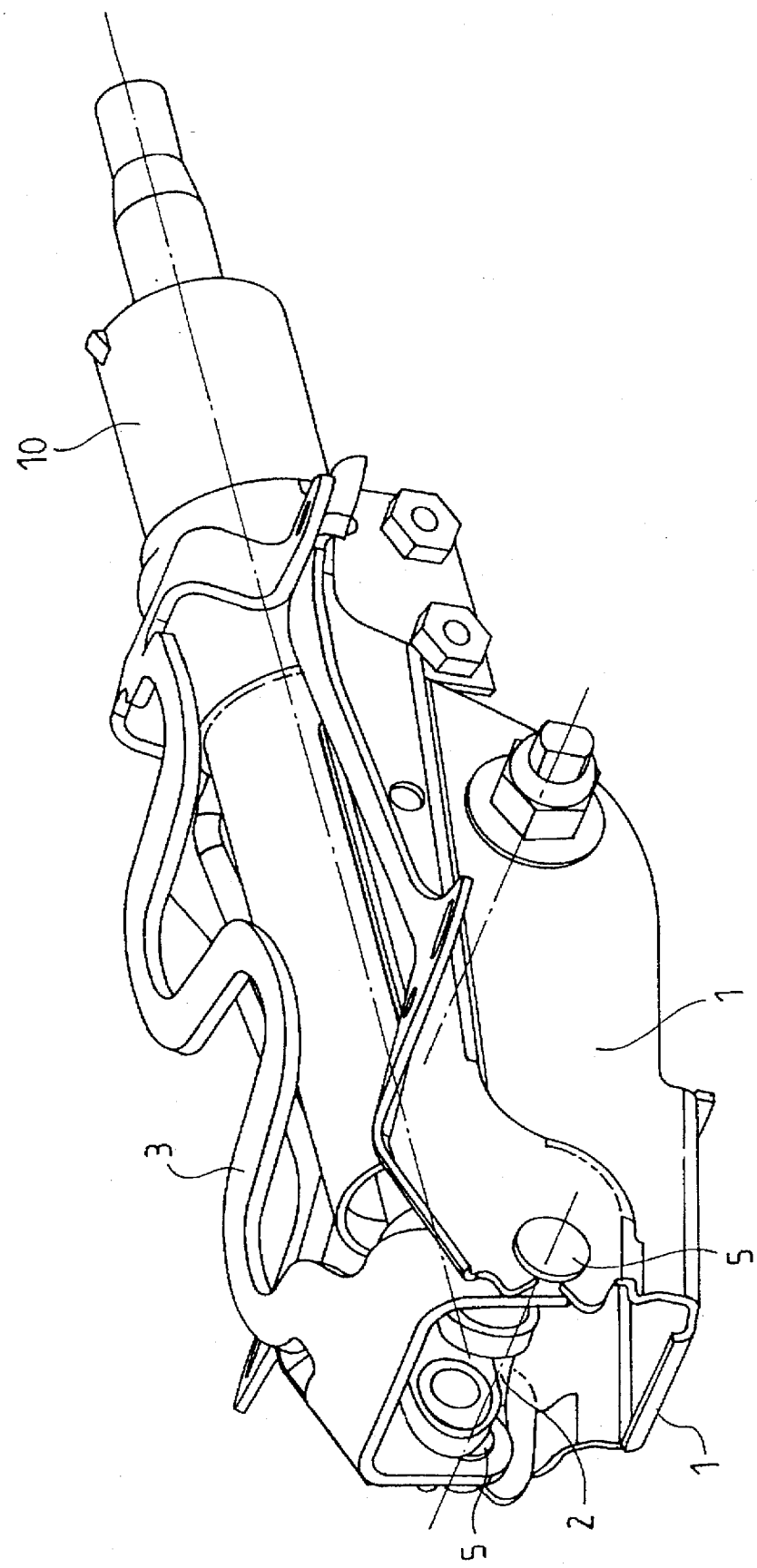
FIGS. 16 and 17 represent in perspective other embodiments of the invention.
Figure 17:
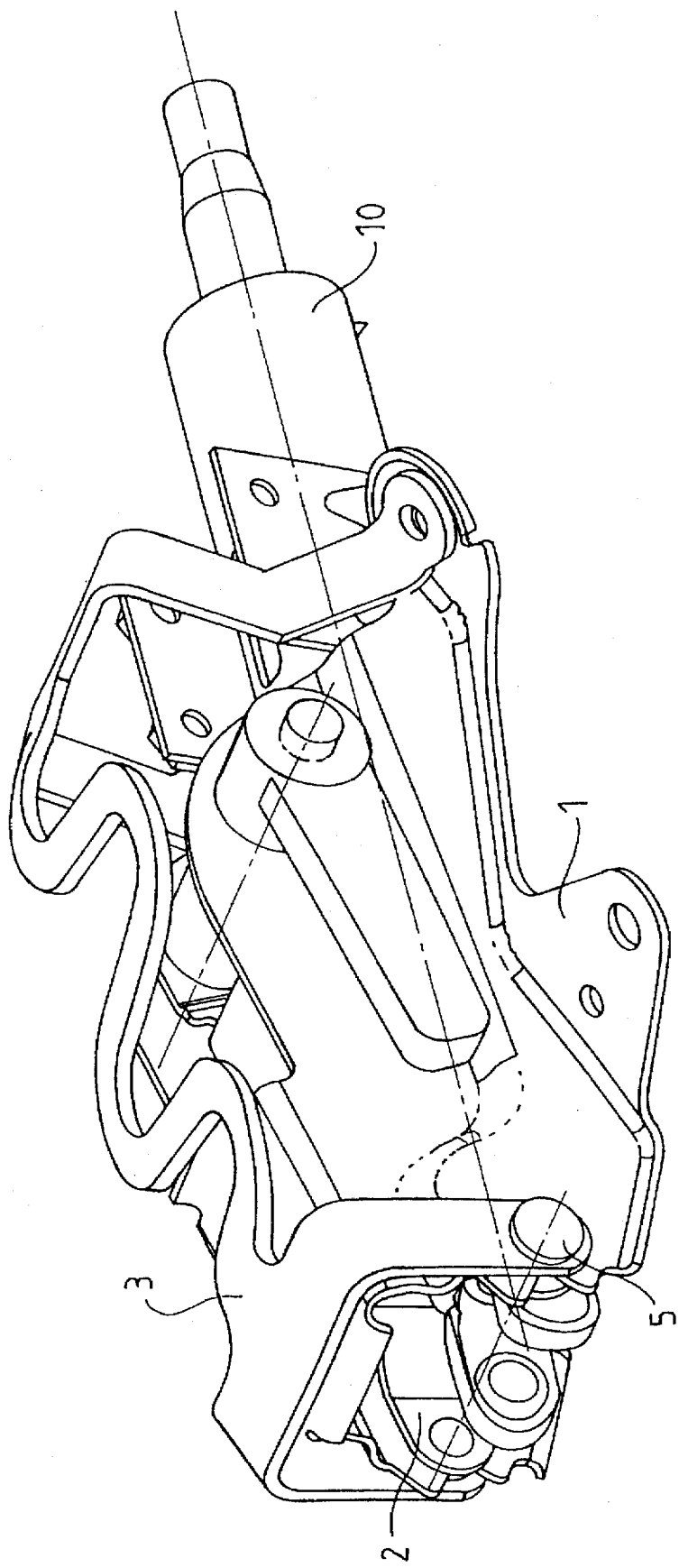

In the case shown in the figures, tie rod 3 is unique and dissymmetrical. Within the framework of the invention, a tie rod 3 can be provided on each vertical member 31 and 32 of support 1, thus forming a symmetrical system. In another embodiment of the invention, shown in FIGS. 16 and 17, the deformation element is a single tie rod 3 placed above the steering shaft, and connected to each semi-axis 5, so as to also produce a symmetrical system. In another embodiment of the invention, not shown in the Figures, the deformable element can be made up of a tie rod placed below the steering shaft, and connected to each semi-axis 5, so as to also produce a symmetrical system.

The energy-absorbing device of the invention operates in the following way. When the driver of the vehicle strikes the steering wheel, he/she exerts force on the body-tube 10 with its reinforcement part 2 in the direction of arrow S as shown in FIG. 2. Reinforcement part 2 is held on support 1 by two semi-axes 5 and the locking system.

If the force exceeds:

the adherence force of reinforcement part 2 with respect to support 1 at the level of the locking system augmented by the force needed by both semi-axes 5 to deform and pass through notches 30 of support 1, then reinforcement part 2 and body-tube 10 begin to move relative to support 1.

Notch 16 in reinforcement part 2 allows reinforcement part 2 to free itself from the locking system.

As soon as this movement has occurred, reinforcement part 2 drives one end of tie rod 3 by means of a semi-axis 5, the other end remaining fixed on support 1. The deformation of tie rod 3 allows the necessary energy to be absorbed. Its particular "meandering" shape allows it to deform over a distance which can be in the order of 20 to 50 mm.

The force required to set the device in motion is controlled by the interference between the diameter of passage hole 29 of the articulation made in each vertical member 30 and 32 of support 1, with the width of notch 30 that exists at the level of the articulation and the thickness of support 1 at the level of the notch. This setting in motion force comprises the force due to this interference augmented by the adherence force at the level of the locking system. This force becomes null after a few millimeters, for example in the order of 5 to 15 mm.

The setting in motion force can be adjusted by acting on the various simple parameters such as interference between the diameter of semi-axis 5 and the width of notch 30, and also the thickness and characteristics of the sheet from which support 1 is made.

The geometry of tie rod 3, i.e. the width of the undulations, its thickness, the number of undulations and the characteristics of the material allow the force and distance of travel to be adjusted, in other words allow the energy absorbed to be precisely adjusted.

In another embodiment of the invention, the steering column can be further simplified by integrating the deformation element in support 1. In this case, the link element is made up of the semi-axis 5 which connects the deformation element integrated in vertical members 31 and 32 of support 1 and the corresponding vertical members 11 and 12 of reinforcement part 2. Each vertical member 31, 32, 11 and 12 has a passage hole 19 and 29 for semi-axis 5 whose head bears against the inner face of vertical member 11, 12 of reinforcement part 2, and whose end bears against the outer face of corresponding vertical member 31, 32 of support 1.

The deformation element integral with support 1 is made up of a zone in each vertical member 31, 32 arranged around passage hole 29 of the articulation of strengthening square 2 of body-tube 10. It is therefore the deformation of support 1 in the zone where semi-axes 5 are located that allows energy to be absorbed. Particular arrangements of this zone enable the force and displacement of reinforcement part 2 with respect to support 1 to be controlled.

Figure 4:
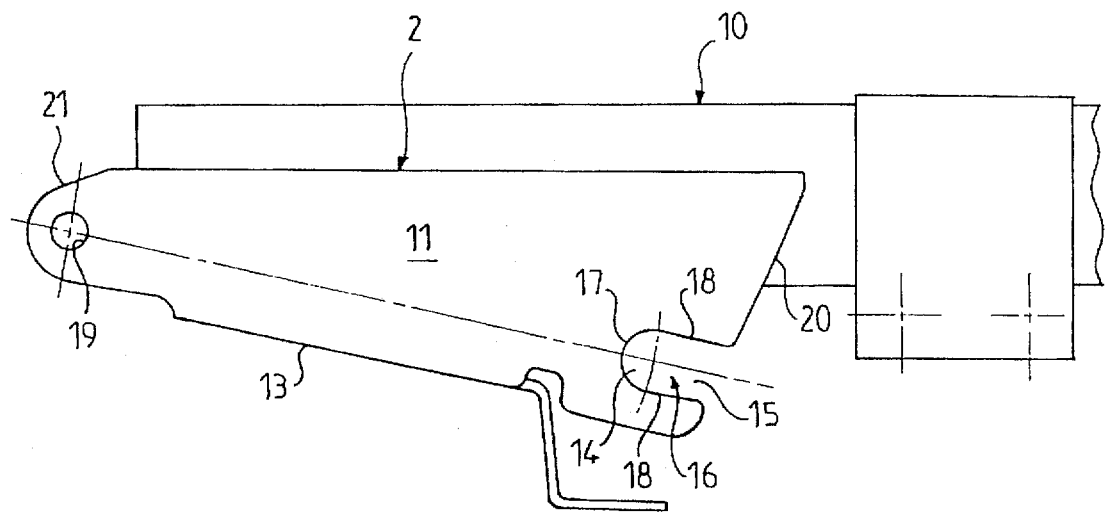
FIG. 4 is a longitudinal view of the body-tube with its reinforcement part according to the invention shown in FIGS. 1 to 3.

The body-tube shown in FIG. 4 with the reinforcement part 2 of the invention can be mounted in the different variants of support 1 shown in FIGS. 5 to 12.

Figure 5:
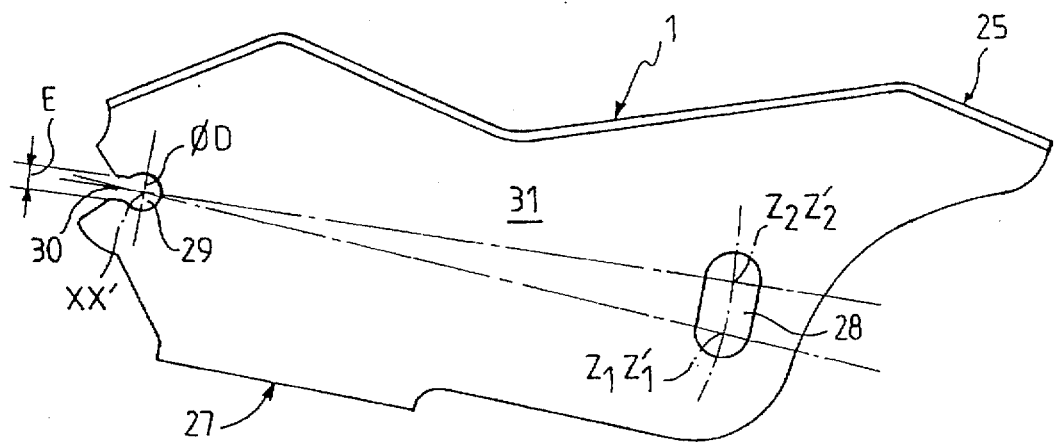
FIG. 5 is a longitudinal view of the support of the invention shown in FIGS. 1 to 3.

The case of FIG. 5 is that corresponding to the embodiment of the invention comprising a tie rod 3 as shown in FIGS. 1 to 3.

FIGS. 6 to 12 show different variants of support 1 when the deformation element is integrated with this support in the zone in which semi-axes 5 are located.

Figure 6:
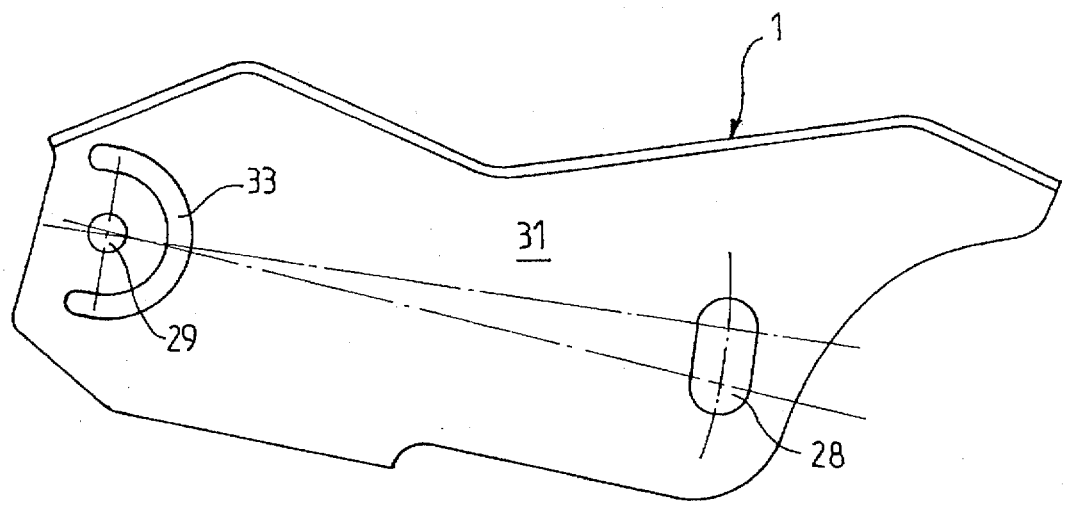
FIG. 6 is a longitudinal view of a variant of the support of the invention.

In the case of FIG. 6, the zone of the deformable element comprises a crescent-shaped cut-out 33 substantially directed in the direction of the inclination axis, i.e. the axis running between passage hole 29 of the articulation and elongated passage hole 28.

Figure 7:
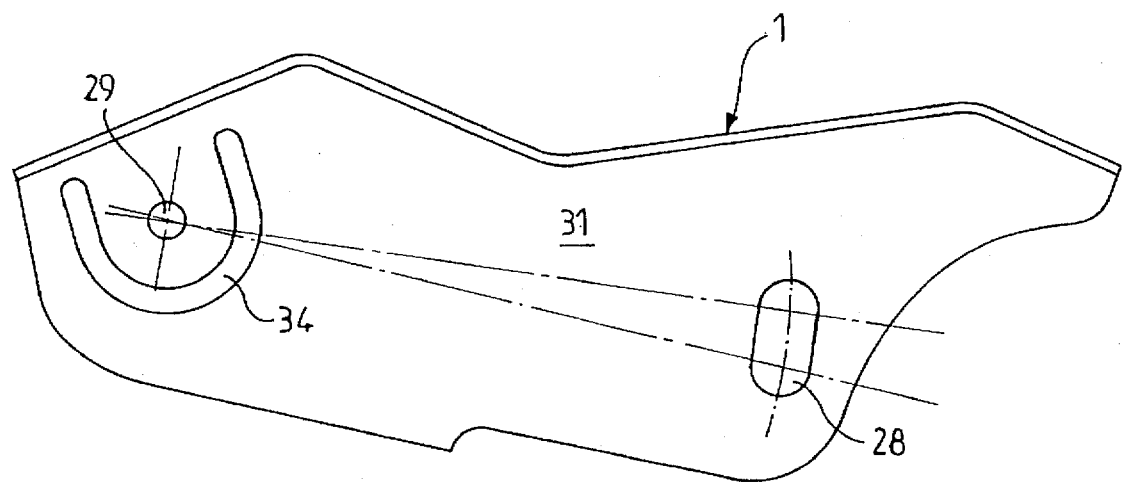
FIG. 7 is a longitudinal view of a variant of the support of the invention.

In the case of FIG. 7, the zone of the deformation element comprises a U-shaped cut-out 34 directed approximately perpendicular to the inclination axis.

Figure 8:
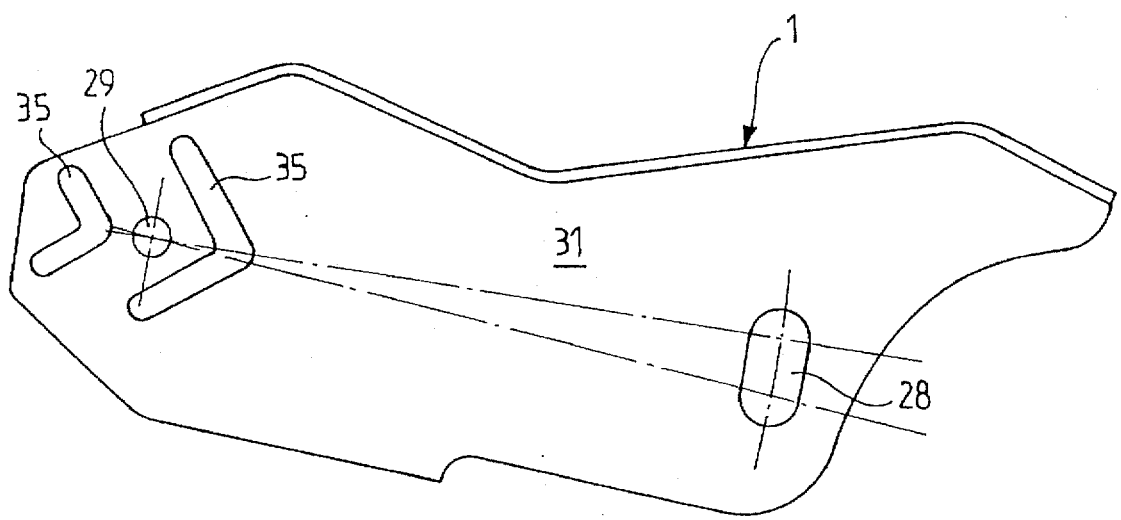
FIG. 8 is a longitudinal view of a variant of the support of the invention.

In the case of FIG. 8, the zone of the deformation element comprises a cut-out 35 in the form of two herring bones arranged either side of passage hole 29 of the articulation and which are directed in the direction of the inclination axis.

Figure 9:
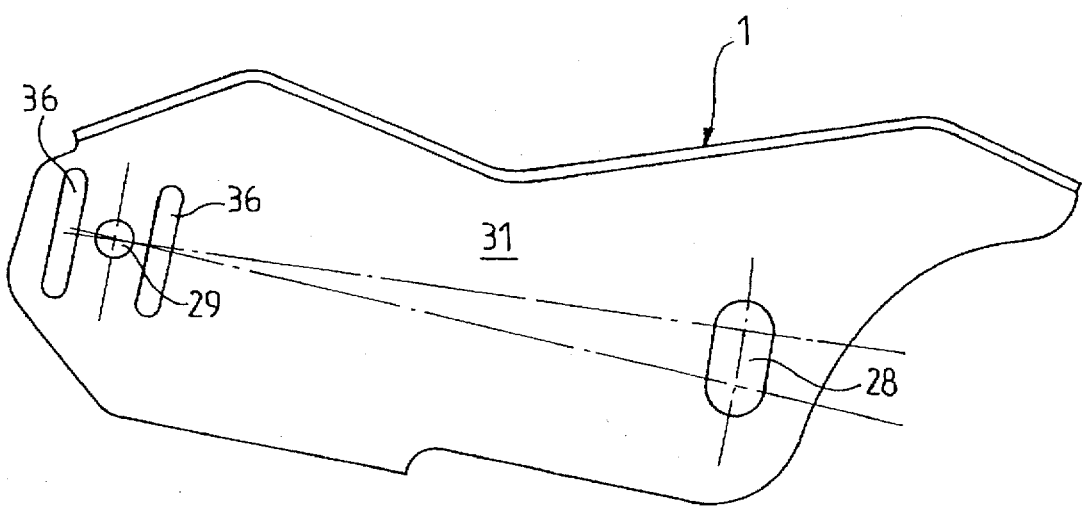
FIG. 9 is a longitudinal view of a variant of the support of the invention.

In the case of FIG. 9, the zone of the deformation element comprises a cut-out 36 in the form of two elongated holes arranged either side of passage hole 29 of the articulation and directed substantially perpendicular to the inclination axis.

Figure 10:
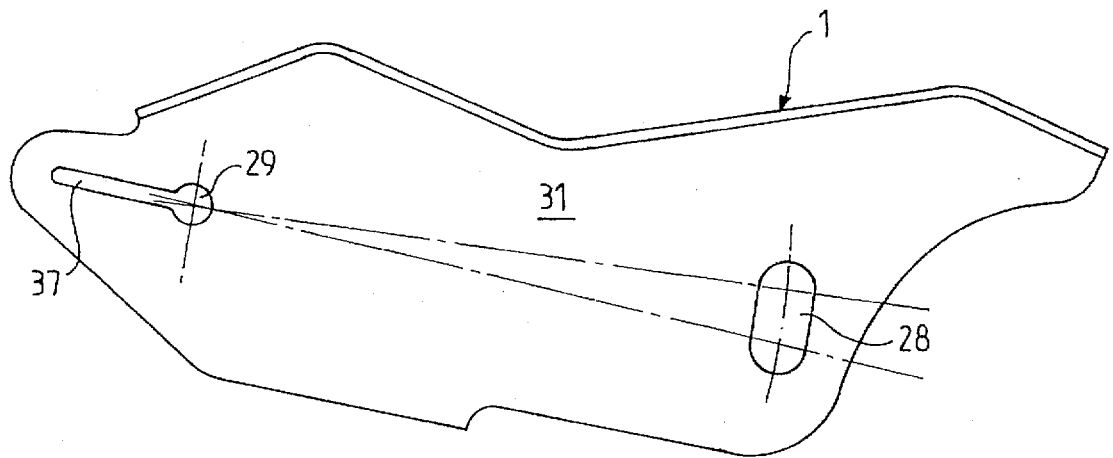
FIG. 10 is a longitudinal view of a variant of the support of the invention.

In the case of FIG. 10, the zone of the deformation element comprises a cut-out 37 in the form of an elongated hole arranged in the direction of the inclination axis, and which leads into passage hole 29 of the articulation.

Figure 11:
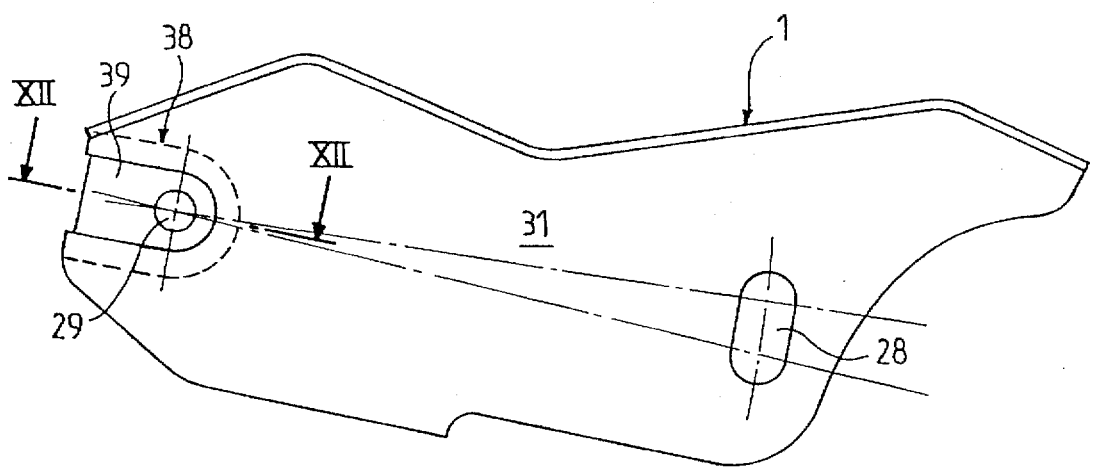
FIG. 11 is a longitudinal view of a variant of the support of the invention.
Figure 12:
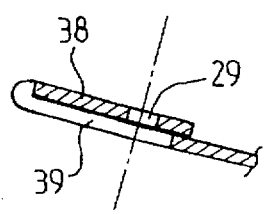
FIG. 12 is a partial section along line XII—XII of FIG. 11.

In the case of FIG. 11, the zone of the deformation element comprises a folded-back portion of vertical member 31, 32 in the form of tab 38, which comprises passage hole 29 of the articulation, and which covers a notch 39 arranged in the direction of the inclination axis.

The operation of the energy-absorbing device in the event of an impact on an automobile vehicle steering column, particularly one which is adjustable in inclination, and whose steering shaft is mounted in a body-tube 10 that is supported and locked to the vehicle body in the desired position, comprises the following phases:

the driver strikes the steering wheel and transmits the force to body-tube 10 with its strengthening square 2, when this force reaches a sufficient value, the reinforcement part drives at least one deformation element so as to absorb energy, the deformation element being rigidly locked with support 1 and connected to the strengthening square by a link element, each passage made in reinforcement part 2 for the axis of the locking system that locks body-tube 10 in support 1 having a release in such a way as to allow reinforcement part 2 to free itself from the locking system.

If the vehicle is fitted with an inflatable safety device known as an air-bag, the driver can also strike the inflated air-bag and transmit the force to the steering wheel via this air-bag.

We claim:

1. An energy-absorbing device for an automobile steering column housing a body-tube and steering shaft therein, said device comprising:

a support mountably fixed on a vehicle body for mounting a steering column body-tube and steering shaft axially thereon;

an attaching device for attaching the body-tube on said support and allowing the body-tube to translate axially relative to said support in a direction away from a driver's wheel in response to an impact force applied to the body-tube in said direction parallel to the longitudinal axis of the body tube, said attaching device comprising a tightening element extending axially normal to the longitudinal axis of the body-tube for establishing a frictional force level at which said impact force can initiate said axial translation of said body-tube;

said support having passages for said tightening element to extend normal to the longitudinal axis of the body-tube effectively allowing the body-tube to translate axially in response to said impact force at a level greater than the established frictional force level, a deformable element cooperating with said fixed support and said body-tube effectively deforming as said body-tube translates axially in said direction to absorb energy of said impact force; and means for defining an at least one articulation for the body-tube to said fixed support and said deformable element to effect the cooperating thereof for effecting said deforming of said deformable element to absorb energy of said support.

2. An energy-absorbing device for an automobile steering column according to claim 1, in which said deformable element is an element separable from said support.

3. An energy-absorbing device for an automobile steering column according to claim 1, in which said deformable element is a deformable tie rod connected to said fixed support and articulated to said body-tube by said means for defining said articulation.

4. An energy-absorbing device for an automobile steering column according to claim 1, in which said deformable element is a deformable area of said fixed support.

5. An energy-absorbing device for an automobile steering column according to claim 1, in which said support comprises a deformable area defining said deformable element having at least one hole therethrough, in which said means for defining an articulation is connected to said fixed support at said area.

6. An energy-absorbing device for an automobile steering column according to claim 1, in which said fixed support comprises two laterally spaced vertical elements fixed to each other, said vertical elements each having a respective lateral extension for securing the support on a vehicle body, and said body-tube is mounted disposed axially between the vertical elements.

7. An energy-absorbing device for an automobile steering column according to claim 6, in which said tightening element comprises a bolt fixed rotationally extending axially through said laterally spaced vertical elements, and a nut on one end of said bolt externally of one of said vertical elements for tightening the vertical elements against said body-tube.

8. An energy-absorbing device for an automobile steering column according to claim 7, in which said attaching device comprises an operator actuable to drive said nut to tighten the vertical elements against the body-tube to establish said determined frictional force level.

9. An energy-absorbing device for an automobile steering column, according to claim 1, in which said tightening element comprises a bolt, and said body-tube comprises reinforcement on opposite sides thereof through which the bolt extends and has passages open toward the driver's wheel to allow the body-tube to translate in response to said impact force.

10. An energy-absorbing device for an automobile steering column according to claim 1, in which said support comprises elongated openings through which said tightening element extends for allowing adjustment of inclination of the steering column.

11. An energy-absorbing device for an automobile steering column according to claim 6, in which said body-tube comprises reinforcement fixed on each opposite side thereof comprising two reinforcement vertical members, one each on opposite sides of the body-tube and welded secure to the body-tube, a connecting element connecting said vertical members spaced parallel;

each vertical member having a passage opening through which said tightening element extends, each passage opening constituting a notch open to an edge of a corresponding vertical member in a direction toward a driver's wheel; and each vertical member having an articulation opening for articulation of each vertical member on said support, each articulation opening being disposed on a part of the respective vertical member farthest removed from a driver's wheel.

12. An energy-absorbing device for an automobile steering column according to claim 11, including an articulation pin on each vertical member received in each corresponding articulation opening.

13. An energy-absorbing device for an automobile steering column according to claim 12, including a distance sleeve about said tightening element disposed between said vertical members constituting said reinforcement parts of said body-tube.

14. An energy-absorbing device for an automobile steering column, according to claim 1, in which said deformable element comprises at least one tie rod connected to said fixed support and articulated to said body-tube for deforming in response to axial translation of the body-tube in response to said impact force to thereby absorb energy of said impact force.

15. An energy-absorbing device for an automobile steering column, according to claim 14, in which said deformable tie rod extends axially parallel to the body-tube.

16. An energy-absorbing device for an automobile steering column, according to claim 15, in which said tie rod is disposed axially alongside the body-tube.

17. An energy-absorbing device for an automobile steering column, according to claim 16, in which said tie rod is disposed above the body-tube.

18. An energy-absorbing device for an automobile steering column, according to claim 16, in which said tie rod is disposed below the body-tube.

* * * * *